US011645495B2

United States Patent
Gao et al.

(10) Patent No.: US 11,645,495 B2
(45) Date of Patent: May 9, 2023

(54) EDGE CALCULATION-ORIENTED REPARAMETRIC NEURAL NETWORK ARCHITECTURE SEARCH METHOD

(71) Applicant: Zhejiang Lab, Zhejiang (CN)

(72) Inventors: Feng Gao, Zhejiang (CN); Wenyuan Bai, Zhejiang (CN)

(73) Assignee: Zhejiang Lab, Zhejiang (CN)

( * ) Notice: Subject to any disclaimer, the term of this patent is extended or adjusted under 35 U.S.C. 154(b) by 0 days.

(21) Appl. No.: 17/888,513

(22) Filed: Aug. 16, 2022

(65) Prior Publication Data

US 2023/0076457 A1 Mar. 9, 2023

Related U.S. Application Data

(63) Continuation of application No. PCT/CN2022/091907, filed on May 10, 2022.

(30) Foreign Application Priority Data

Aug. 27, 2021 (CN) .......................... 202110991876.7

(51) Int. Cl.
*G06N 3/04* (2023.01)
*G06N 3/08* (2023.01)

(52) U.S. Cl.
CPC ................ *G06N 3/04* (2013.01); *G06N 3/08* (2013.01)

(58) Field of Classification Search
CPC ...... G06N 3/0454; G06N 3/08; G06K 9/6256; G06W 20/13; G06W 40/103
USPC .......................................................... 706/12
See application file for complete search history.

(56) References Cited

PUBLICATIONS

Andrew G. Howard et al., "MobileNets: Efficient Convolutional Neural Networks for Mobile Vision Applications," arXiv:1704.04861 [cs.CV], Apr. 2017, pp. 1-9.
Xiaohan Ding et al., "RepVGG: Making VGG-style ConvNets Great Again," arXiv:2101.03697 [cs.CV], Jan. 2021, pp. 1-10.

*Primary Examiner* — Michael J Huntley
*Assistant Examiner* — Peter D Coughlan
(74) *Attorney, Agent, or Firm* — JCIPRNET

(57) ABSTRACT

The present invention discloses an edge calculation-oriented reparametric neural network architecture search method, including the following steps: S1: designing linear operators and multi-branch block structures; S2: constructing a hypernetwork by stacking the multi-branch block structures; S3: training the hypernetwork through a gradient-based first-stage search algorithm; S4: deleting redundant branches in the hypernetwork to construct an optimal subnetwork; S5: converting the multi-branch optimal subnetwork into a single-branch network; and S6: completing task reasoning by using the single-branch network. The method is used to search the neural network structure capable of performing reparameterization, and ensures the reasoning real-time performance and the high efficiency of model operation while ensuring the reasoning precision.

10 Claims, 4 Drawing Sheets

EDGE CALCULATION-ORIENTED REPARAMETRIC NEURAL NETWORK ARCHITECTURE SEARCH METHOD

CROSS-REFERENCE TO RELATED APPLICATIONS

This application is a continuation of international PCT application serial no. PCT/CN2022/091907, filed on May 10, 2022, which claims the priority benefit of China application serial no. 202110991876.7, filed on Aug. 27, 2021. The entirety of the above-mentioned patent applications are hereby incorporated by reference herein and made a part of this specification.

TECHNICAL FIELD

The present invention relates to the technical field of neural network architecture search, in particular to an edge calculation-oriented reparametric neural network architecture search method.

BACKGROUND

Neural network architecture search is a research hotspot in the field of machine learning in recent years, and this technology includes design of search operators and spaces, design of search algorithms and the like. At present, the neural network architecture search technology can be used to automatically design neural network models of various sizes to avoid manual complex parameter adjustment. One of the most promising applications is the design of a lightweight neural network model to improve an application ability of a neural network on mobile devices.

In mobile devices, the real-time performance and accuracy of neural network reasoning are two major factors to be considered. In a lightweight neural network model artificially designed at an early stage, Howard et al. proposed MobileNet, this neural network is in a single-branch structure, and the params of the network are greatly reduced through alternating operations of 1×1 point-wise convolution and 3×3 depth-wise separable convolution, thus improving a reasoning speed (Howard, A. G., Zhu, M., Chen, B., Kalenichenko, D., Wang, W., Weyand, T., Andreetto, M., Adam, H.: Mobilenets: Efficient convolutional neural networks for mobile vision applications. In ArXiv abs/1704.04861, 2017.). However, it is difficult to obtain a high accuracy as this model is in a single-branch structure. Meanwhile, the params or floating point operations per second (FLOPs) of the network are often regarded as an indicator for measuring the speed of a model in many works when a lightweight model is designed artificially. However, nonparametric and low-FLOPs operations, such as skip connections, will still slow down the reasoning speed.

In order to alleviate the problems of low accuracy of a network in a depth-wise single-branch structure and slow reasoning of a network in a multi-branch structure, Ding et al. proposed to train the neural network by a structural reparametric technology, that is, the network is in a multi-branch structure during network training, and the network is in a single-branch structure during network reasoning (Xiaohan Ding and Xiangyu Zhang and Ningning Ma and Jungong Han and Guiguang Ding and Jian Sun.: RepVGG: Making VGG-style ConvNets Great Again. In CVPR, 2021). In addition, most of deep learning reasoning frameworks are optimized for 3×3 convolutions, so a very high reasoning speed can be obtained by a single-branch structure that fully consists of 3×3 convolutions.

Although the actual reasoning speed of RepVGG models have been greatly improved, the branch structures are artificially fixed, so there is still very large space to improve the accuracy of a network model. In addition, too many branches will greatly increase a video memory space required for training the network model. Therefore, how to efficiently improve the performance of the model through the reparametric technology has become a problem that needs to be solved at present.

SUMMARY

In order to overcome the deficiencies of the prior art, the present invention provides a reparametric neural network model that is easy to implement, high in applicability and capable of performing search under an edge calculation condition to achieve the purpose of improving real-time detection speed while ensuring a high precision in a network. The present invention adopts a technical solution as follows:

An edge calculation-oriented reparametric neural network architecture search method includes the following steps:

S1, designing operators and search spaces of all branches, in order to enhance a feature extraction ability of K×K convolutions, setting branches for each original K×K convolution, including convolution and short cut of other scales, and constituting multi-branch blocks to be used for extracting image features under different visual fields;

S2, constructing a hypernetwork that contains all branches, and constructing a single-branch redundant network structure by stacking multi-branch blocks of K×K convolutions constantly by reference to a straight tube-shaped design in a VGG network;

S3, training the hypernetwork by a discrete neural network architecture search method under restrictions of a given video memory, including the following steps:

S31, giving a maximum limit C of the video memory, and initializing a structural parameter $\alpha$ and a weight parameter $\theta$ of each branch;

S32, calculating the importance of each branch:

$$Z_{i,j} = \frac{1}{1 + \exp((\alpha_{i,j} + \zeta_{i,j})/\lambda_{i,j})} \quad (1)$$

where $Z_{i,j}$ represents an importance of the $j^{th}$ branch in the $i^{th}$ multi-branch block, exp( ) represents an index e, $\alpha_{i,j}$ represents a structural parameter of the $j^{th}$ branch in the $i^{th}$ multi-branch block, $\zeta_{i,j}$ represents sampling noise of the $j^{th}$ branch in the $i^{th}$ multi-branch block, $\lambda_{i,j}$ represents a temperature coefficient of the $j^{th}$ branch in the $i^{th}$ multi-branch block, and an initial value of the temperature coefficient is 1 here;

S33, calculating whether each branch is activated:

$$\begin{cases} \lim_{\lambda_{i,j} \to 0+} Z_{i,j} = 0, & \text{if } R_{i,j} < 0 \\ \lim_{\lambda_{i,j} \to 0-} Z_{i,j} = 0, & \text{if } R_{i,j} > 0 \text{ and } \text{rank}(R_{i,j}) < s \\ \lim_{\lambda_{i,j} \to 0+} Z_{i,j} = 1, & \text{other} \end{cases} \quad (2)$$

where $R_{i,j} = \alpha_{i,j} + \zeta_{i,j}$, Rank $(R_{i,j})$ represents an importance ranking of the $j^{th}$ branch in the $i^{th}$ multi-branch block in all the branches, s represents a ranking threshold, the maximum limit C of the video memory is satisfied by adjusting the magnitude of s, and the branches below the ranking threshold is not activated;

S34, acquiring training data, acquiring different image features for each branch in the multi-branch block, activating branches with a value of 1 in formula (2), performing forward reasoning, and then calculating a loss function L (cross entropy) of a predicted image classification label and a real image classification label;

S35, calculating a gradient of the weight parameter θ and a gradient of the activation parameter Z on the loss function L respectively through back propagation, wherein the activation parameter Z is a vector composed of $Z_{i,j}$, and calculating a gradient of the structural parameter a on log p(Z) at the same time, wherein Z is dispersed α, and p(α) is a result after the structural parameter α is randomized by the following formula $$p(\alpha) = \frac{1}{1+\exp(-\alpha)} \tag{3}$$

S36, updating the weight parameter θ according to the gradient on L, and updating the structural parameter a according to the following formula (when it is not random sampling, calculating the gradient of the structural parameter α according to the following formula)

$$E_{Z_{i,j} \sim p(Z_{i,j})}\left[\frac{\partial L}{\partial \alpha_{i,j}}\right] = E_{Z \sim p(Z_{i,j})}\left[\nabla_{\alpha_{i,j}} \log p(\alpha_{i,j}) \frac{\partial L}{\partial z_{i,j}}\right] \tag{4}$$

where $E_{Z \sim p(z,j)}$, represents an expectation under a probability distribution of $p(Z_{i,j})$ during Z sampling, and $\nabla \alpha_{i,j}$; is a gradient of the structural parameter a of the $j^{th}$ branch in the $i^{th}$ multi-branch block on log p(Z); and S37, returning to S32 until the weight parameter and the structural parameter in the hypernetwork are trained to converge;

S4, removing redundant branches from the hypernetwork after training to obtain an optimal subnetwork, removing according to formula (2) inactivated branches in the hypernetwork trained in S3, and inheriting the weight parameters of the remaining branches directly from the hypernetwork without retraining or fine tuning;

S5, fusing the multi-branch optimal subnetwork into a single-branch optimal subnetwork; and S6, acquiring image features by using the single-branch optimal subnetwork, performing real-time reasoning, and performing image classification on the fused single-branch subnetwork, wherein there is no difference in accuracy between the network before fusion and the network after fusion, but the params and the reasoning time of the network are greatly reduced.

Further, the S5 "fusing the multi-branch optimal subnetwork into a single-branch optimal subnetwork by a reparameterization method" includes the following steps:

S51, fusing weight parameters of a convolutional layer and a BN layer in each branch reserved by a reparameterization method;

S52, fusing all the branches into a convolution of the same scale as the original convolution by a reparameterization method, and fusing the convolution with the original K×K convolution into one convolution $F^j$ respectively; and S53, fusing multi-branch K×K convolutions F' in the same multi-branch block into one K×K convolution.

Further, the formula of reparametric fusion in in the S51 is as follows $$F'_{m,:,:,:} = \frac{\gamma_m}{\sigma_m} F_{m,:,:,:}, \quad b'_m = -\frac{\mu_m \gamma_m}{\sigma_m} + \beta_m \tag{5}$$

where γ represents a scaling parameter of the BN layer, μ represents a mean value of BN layer features, σ represents a standard deviation of BN layer features, β represents a translation parameter of the BN layer, $F'_{m,:,:,:}$ and $F_{m,:,:,:}$ represent weight parameters of the $m^{th}$ output channel of the convolutional layer after and before fusion respectively, $b'_m$ and $b_m$ represent offset parameters of the $m^{th}$ output channel of the convolutional layer after and before fusion respectively, and: in the subscript represents all elements of this dimension Further, in the S52, each branch is converted into the same scale as the original K×K convolution respectively at first, then the converted K×K convolution of each branch is fused with the original K×K convolution into one K×K convolution respectively according to the reparametric formula as follows:

$$F^j = F^2 * \text{TRANS}(F^1), \quad b_m^j = \sum_{d=1}^{D}\sum_{u=1}^{K_1}\sum_{v=1}^{K_2} b_d^1 F_{m,d,u,v}^2 + b_d^2 \tag{6}$$

where TRANS represents a transposition operation on a tensor, $F^1$ represents a converted K×K convolution of the $j^{th}$ branch, $F^2$ represents an original K×K convolution, D is the number of input channels, $K_1$ and $K_2$ are convolution kernel sizes, $F^j$ represents a fused K×K convolution corresponding to the $j^{th}$ branch, $b_m^j$ represents an offset of the $m^{th}$ output channel of the fused convolutional layer, $b_d^1$ represents an offset of the $d^{th}$ input channel of the converted K×K convolution of the $j^{th}$ branch, $b_d^2$ represents an offset of the $d^{th}$ input channel of the original K×K convolution, and $F_{m,d,u,v}^2$ represents a weight of the $u^{th}$ line and the $v^{th}$ column of the convolution kernel under the $m^{th}$ input channel and the $d^{th}$ output channel of the original K×K convolution.

Further, the branch convolutions in the S52, i.e., 1×1 convolution, 1×K convolution, K×1 convolution, 1×1-AVG and short cut, are converted into the same scale as the original K×K convolution through zero filling operation.

Further, the reparametric formula of fusing multiple convolutions into one convolution in the S53 is as follows $$F' = F^1 + F^2 + \ldots + F^N, b' = b^1 = b^2 + \ldots + b^N \tag{7}$$

where N is a number of branches, and b' is an offset after fusion.

Further, after initialization in the S31, firstly, the branches are sampled randomly, and only the weight θ is updated; secondly, the importance of the branches is sampled, and the structural parameter α and the weight parameter θ are updated; finally, the importance of the branches is sampled, the structural parameter α is fixed, and only the weight parameter θ is updated.

Further, the sampling noise in the S32 follows a Logistics distribution log $(-\log(u_1))-\log(-\log(u_2))$ with the mean value being 0 and the variance being 1, where both $u_1$ and $u_2$ are $u_1 \sim U(0, 1)$, representing that $u_1$ follows a uniform distribution from 0 to 1.

Further, the original convolution in the S1 is the original K×K revolution, which has 6 branches, and the operators of the convolution are respectively: 1×1 convolution, 1×K convolution, K×1 convolution, 1×1-K×K convolution, 1×1-AVG convolution and short cut.

Further, in the S1, although the multi-branch structure can strengthen the ability of network feature extraction, it will greatly reduce the network reasoning speed. In order to improve the reasoning speed by using a reparameterization technology, the operator of each branch must be linear, and then a Batch Normalization (BN) layer with scaling and translation is used instead of additional nonlinear operation, so that a certain nonlinear transformation is applied to the result of each operator. In order to further enhance the nonlinear ability of the network, the output of a current block will be subject to nonlinear transformation through a Rectified Linear Unit (ReLU) layer, that is, a BN operation is added after the operator of each branch, the output results of each branch are added together according to elements, subject to a nonlinear operation (ReLU), and combined as the output of the current multi-branch blocks.

The present invention has the advantages and beneficial effects that:

The training efficiency and network accuracy are greatly improved when the network is trained by using a reparametric technique, the calculation quantity and memory capacity of neural network training are reduced, and a trained model is enabled to have better performance; moreover, after the training is completed, the multi-branch structure network can be transformed into a single-branch network without any loss, so that the params and reasoning time during network reasoning are reduced.

DETAILED DESCRIPTION OF THE EMBODIMENTS

The detailed description of the embodiments of the present invention will be described in detail below in association with the accompanying drawings. It should be understood that the detailed description of the embodiments described herein are only used to describe and interpret, rather than to limit, the present invention.

According to the present invention, a multi-branch block is constructed as a search space at first, the multi-branch block can be fused into a single-branch block by a reparameterization technology, and the multi-branch block consists of a 1×1 convolution, a 1×K convolution, a K×1 convolution, a 1×1-K×K convolution, a 1×1-AVG convolution and a short cut. A hypernetwork is constructed by stacking multi-branch blocks, and the hypernetwork contains all subnetwork structures. Then the hypernetwork is trained, an optimal branch structure is searched for each block progressively in the training process, and the branch structures of different blocks may be different. At the beginning of training, there is a certain probability of being sampled for each branch in each iteration process. The weight parameter and structural parameter (sampling probability) of a sampled branch will be updated. With the deepening of training, the number of sampling times for useless branches will gradually decrease until these branches are not sampled at all. After the training is ended, those branches not sampled any longer will be removed, and the remaining branches will be fused into one branch according to reparameterization technology to improve the reasoning speed of the network.

Figure 1:
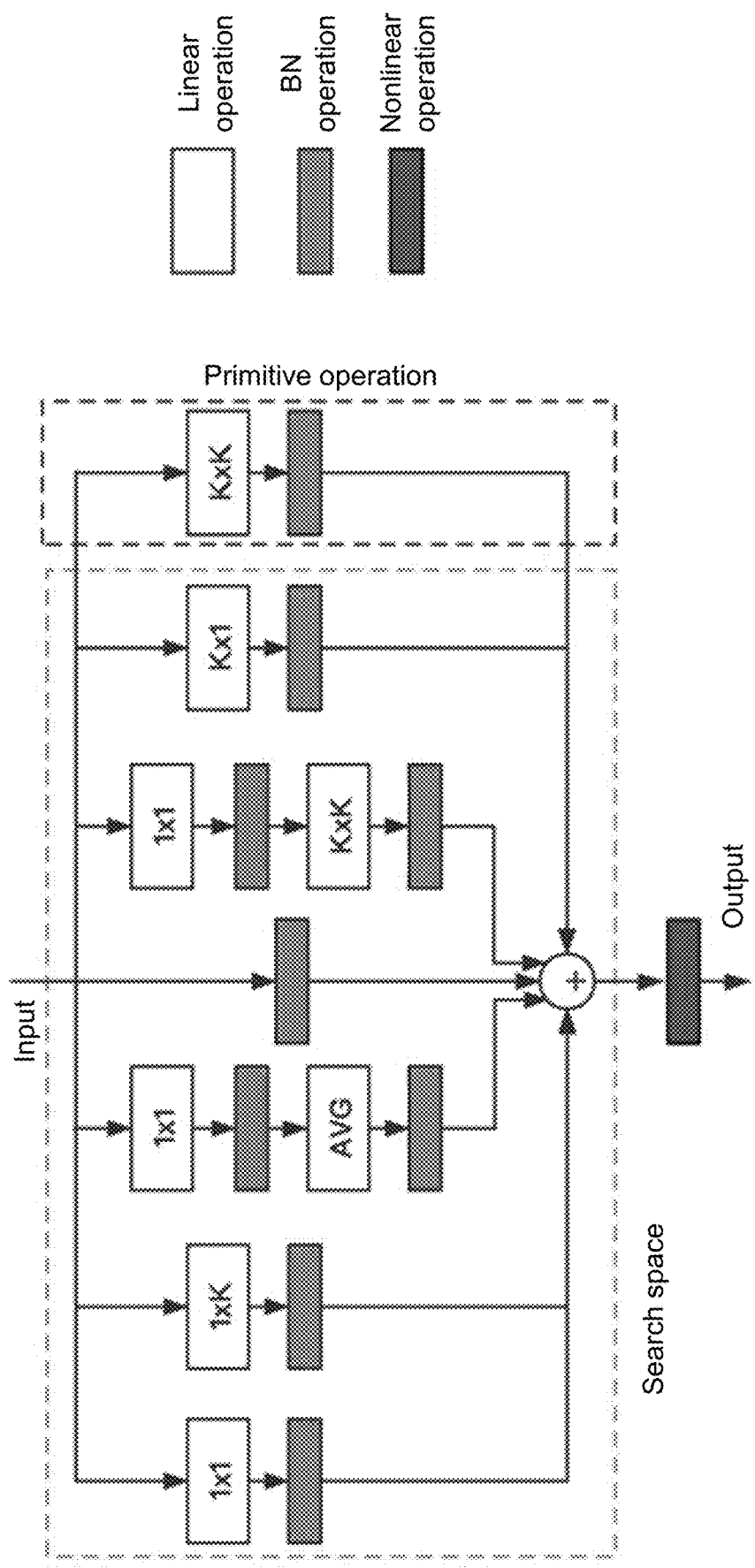
FIG. 1 is a structural diagram of search operators and multi-branch blocks in the present invention.

Specifically, the embodiment relates to an edge calculation-oriented reparametric neural network architecture search method, including the following steps:

S1: a structure of search operators and multi-branch blocks are designed, as shown in FIG. 1;

S1-1: image features under different visual fields can be extracted for convolutions with different kernel sizes, and thus convolutions with different kernel sizes or an average pooling operator is used for every branch, the skip connection (short cut) used in the ResNet series network can be regarded as a 1×1 convolution with a weight parameter being always 1, the convolution kernel size is K=3 here, the operators in 6 branches designed are: 1×1 convolution, 1×3 convolution, 3×1 convolution, 1×1-3×3 convolution, 1×1-AVG convolution and short cut, and final results of all the branches are combined by adding elements together as the output of the current block respectively; and S1-2: although the multi-branch structure can strengthen the ability of network feature extraction, it will greatly reduce the speed of network reasoning. In order to improve the reasoning speed by using a reparameterization technology, the operator of each branch must be linear, and then a BN layer with scaling and translation is used instead of additional nonlinear operation, so that certain nonlinear transformation exists in the result of each operator. In order to further enhance the nonlinear ability of the network, the output of a current block will be subject to nonlinear transformation through a ReLU layer.

S2: a hypernetwork is constructed;

S2-1: the multi-branch blocks designed in S1 are stacked continuously using experiences in many artificially designed networks to form a hypernetwork with redundant branches; the hypernetwork constructed here contains 22 multi-branch blocks, the numbers of output channels of each block are respectively 48, 48, 48, 96, 96, 96, 96, 192, 192, 192, 192, 192, 192, 192, 192, 192, 192, 192, 192, 192, 192 and 1,280, a step of each operator in the 1st, 2nd, 4th, 8th and 22th multi-branch blocks is 2, and the step is used for downsampling of images; finally, feature images outputted from the network will pass through a global average pooling layer, and the value of each class is outputted by a fully connected layer with an input of 1,280 dimensions and an output of 1,000 dimensions.

Figure 2:
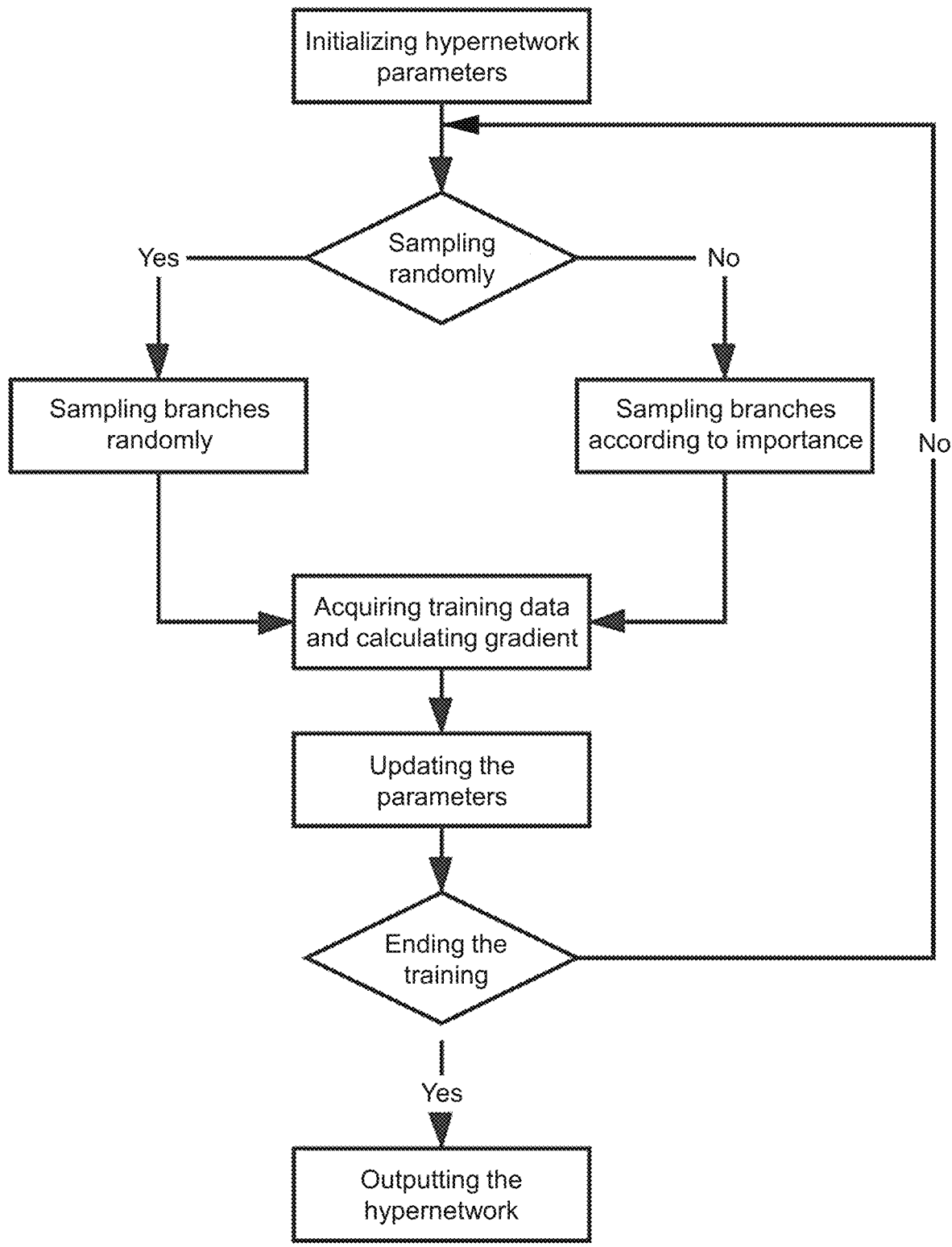
FIG. 2 is a flow chart of a hypernetwork training stage in the present invention.

S3: the well-constructed hypernetwork is trained on a ImageNet-1K data set, and the training flow chart is as shown in FIG. 2;

S3-1: the weight parameter $\theta$ and the structural parameter $\alpha$ of the super network are initialized, and the hyperparameters of the training are set as follows: a weight parameter optimizer is Stochastic Gradient Descent (SGD) with momentum, an initial learning rate is 0,1, a momentum is 0.9, a weight decay is 0.0001, a learning rate decay is performed through CosineAnnealingLR for each iteration, the structural parameter optimizer is Adam, with an initial learning rate of 0.0001 and betas of (0.5, 0.999), and no weight decay is performed; a batch size of the training is 256, a total of 120 epochs are trained for the hypernetwork, wherein random sampling is performed in the first 15 epochs, and only the weight parameter is updated; the structural parameter and weight parameter are updated in the middle 50 epochs; and only the weight parameter is updated for the fixed structure in the last 55 epochs; in this implementation process, the total number C of branches is set as 75, that is, the maximum limit C of a given video memory is 75;

S3-2: if random sampling is performed, each branch has a 50% probability of being activated; if it is not random sampling, the importance of each branch is calculated according to formula (1), and then branches with importance of higher than 0 are activated according to formula (2);

S3-3: a batch of training data are acquired, forward reasoning is performed by using the activated branch, a loss function is calculated, cross entropy is used for the loss function here, and the gradient of the weight parameter θ is calculated through back propagation, wherein the gradient of the structural parameter a needs to be calculated according to formula (4) if it is not random sampling;

S3-4: the weight parameter θ is updated with an SGD optimizer, and the structural parameter α is updated with an Adam optimizer; and S3-5: if the training is not ended, return to S3-2; if the training is ended, the trained hypernetwork is outputted.

Figure 4:
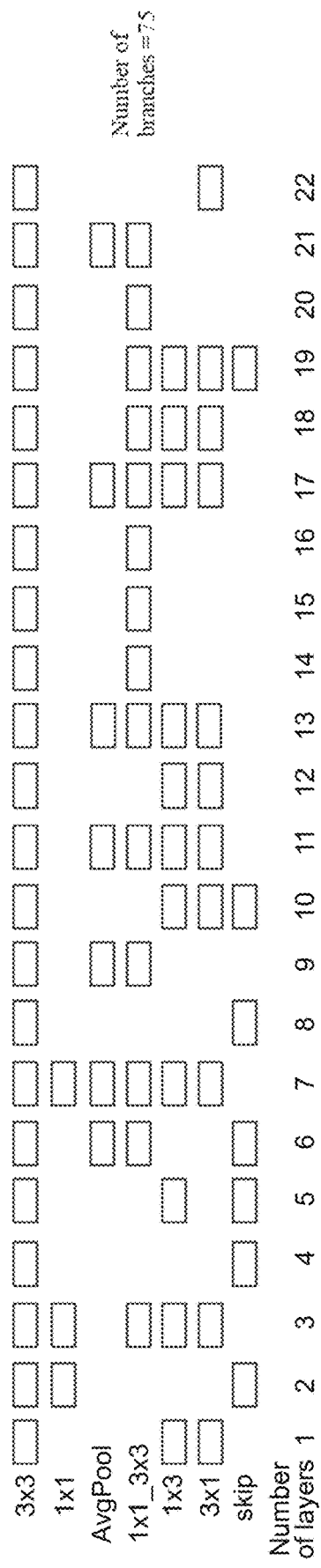
FIG. 4 is a structural view of the hypernetwork composed of the remaining branches in the present invention.

S4: the inactive branches in the trained hypernetwork are deleted, and the remaining branches and the corresponding weight parameters are retained. The hypernetwork structure composed of the remaining branches is as shown in FIG. 4. The hypernetwork is tested on a test set to obtain a top-1 accuracy rate of 72.96%, wherein the reasoning time required for each batch of images is 0 68 seconds.

Figure 3:
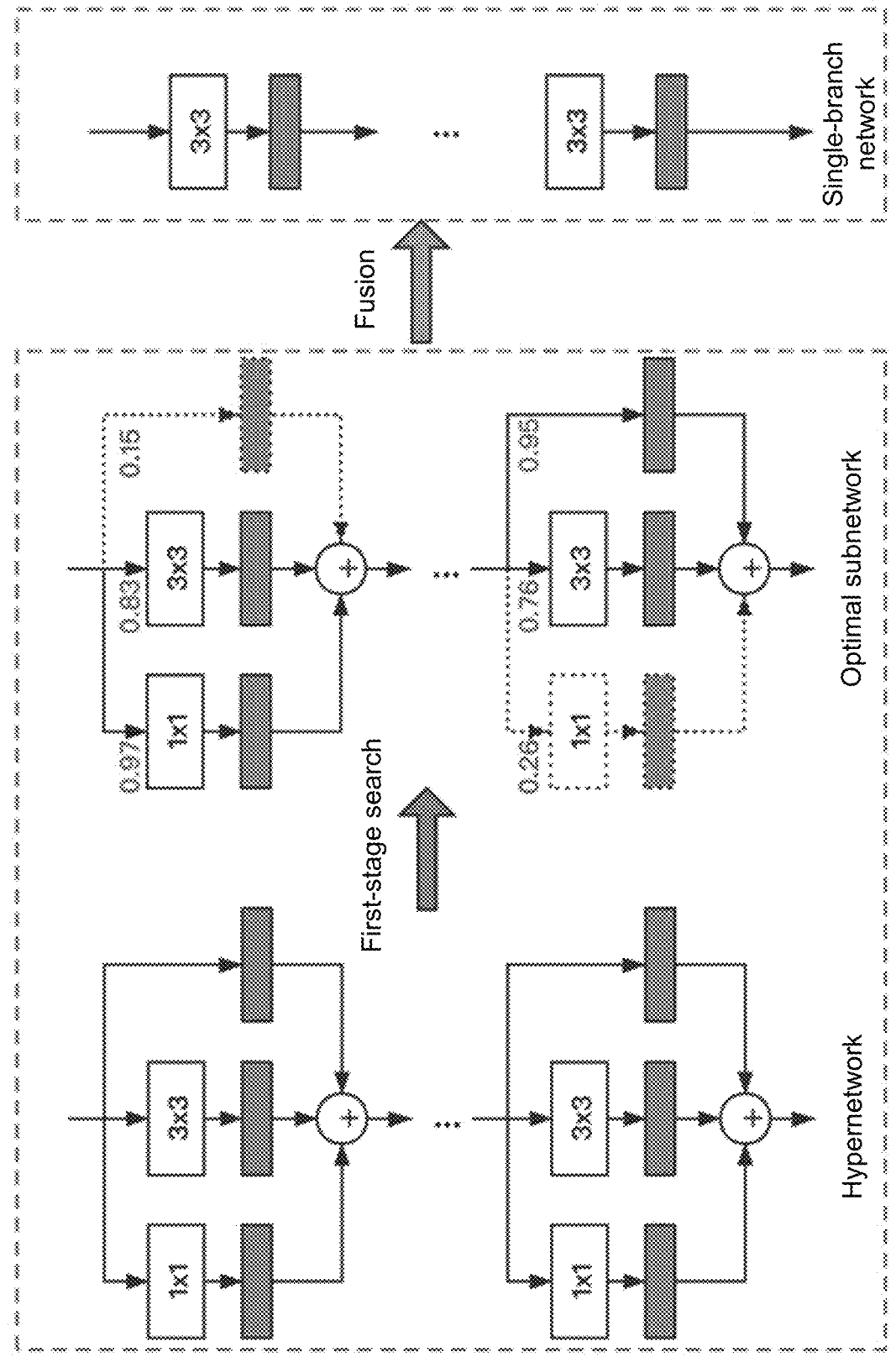
FIG. 3 is a schematic diagram of fusing multiple branches into a single branch in the present invention.

S5: the branches of each block in the hypernetwork are merged, and the merging diagram is as shown in FIG. 3;

S5-1: the BN layer following each operator is merged according to formula (5) and the operator; and S5-2: the 1×1 convolution, 1×3 convolution, 3×1 convolution, AVG and short cut are converted into a 3×3 convolution by zero filling, then the 3×3 convolution and the original 3×3 convolution of each branch are merged according to formula (6).

S6: image classification is performed on the single-branch model after fusion on the test set, wherein the test device is Intel Core i7 central processing unit (CPU), and the accuracy, reasoning speed, params and FLOPs of the model are shown in Table 1. The model trained by the method of the present patent has the same reasoning speed and model size as those of a single-branch training model, but the accuracy is much higher than that of the single-branch training model; in addition, compared with a multi-branch reasoning model, the method of the present patent can fuse multiple branches into a single branch, so it can greatly reduce the params and calculation quantity of the model without losing any performance.

TABLE 1

Comparison of Model Reasoning Results

| Method | Top1 accuracy (%) | Reasoning speed (s) | Params (M) | FLOPS (G) |
| --- | --- | --- | --- | --- |
| Single-branch training and single-branch reasoning | 69.12 | 0.26 | 6 | 2 |
| Multi-branch training and multi-branch reasoning | 72.96 | 0.68 | 23 | 14 |
| Multi-branch training and single-branch reasoning (method of the present patent) | 72.96 | 0.26 | 6 | 2 |

The above-mentioned embodiments are only used to illustrate, rather than to limit, the technical solution of the present invention. Although the present invention has been described in detail by reference to the foregoing embodiments, those skilled in the art should understand that: they can still modify the technical solution recorded in the foregoing embodiments, or make equivalent replacements to some or all of the technical features in the technical solution. These modifications or replacements will not cause the essence of the corresponding technical solution to depart from the scope of the technical solution in the embodiments of the present invention.

What is claimed is:

1. An edge calculation-oriented reparametric neural network architecture search method, comprising the following steps:

S1, designing operators and search spaces of all branches, setting branches for original convolutions, and constituting multi-branch blocks to be used for extracting image features under different visual fields;

S2, constructing a hypernetwork that contains all branches, and constructing a network structure of the branches by stacking multi-branch blocks constantly;

S3, training the hypernetwork by a discrete neural network architecture search method under restrictions of a given video memory, comprising the following steps:

S31, giving a maximum limit C of the video memory, and initializing a structural parameter a and a weight parameter θ of each branch;

S32, calculating the importance of each branch:

$$Z_{i,j} = \frac{1}{1 + \exp((\alpha_{i,j} + \zeta_{i,j})/\lambda_{i,j})} \quad (1)$$

where $Z_{i,j}$ represents an importance of a $j^{th}$ branch in an $i^{th}$ multi-branch block, exp( ) represents an index e, $\alpha_{i,j}$ represents a structural parameter of the $j^{th}$ branch in the $i^{th}$ multi-branch block, $\zeta_{i,j}$ represents sampling noise of the $j^{th}$ branch in the $i^{th}$ multi-branch block, represents a temperature coefficient of the $j^{th}$ branch in the $i^{th}$ multi-branch block;

S33, calculating whether each branch is activated:

$$\begin{cases} \lim_{\lambda_{i,j} \to 0+} Z_{i,j} = 0, & \text{if } R_{i,j} < 0 \\ \lim_{\lambda_{i,j} \to 0-} Z_{i,j} = 0, & \text{if } R_{i,j} > 0 \text{ and } \text{rank}(R_{i,j}) < s \\ \lim_{\lambda_{i,j} \to 0+} Z_{i,j} = 1, & \text{other} \end{cases} \quad (2)$$

where $R_{i,j} = \alpha_{i,j} \zeta_{i,j}$, Rank ($R_{i,j}$) represents an importance ranking of the $i^{th}$ branch in the $i^{th}$ multi-branch block in all the branches, s represents a ranking threshold, the maximum limit C of the video memory is satisfied by adjusting the magnitude of s, and the branches below the ranking threshold is not activated;

S34, acquiring training data, acquiring different image features for each branch in the multi-branch block, activating the branches with a value of 1 in formula (2), performing forward reasoning, and then calculating a loss function L of a predicted image classification label and a real image classification label;

S35, calculating a gradient of the weight parameter θ and a gradient of the activation parameter Z on the loss function L respectively through back propagation, wherein the activation parameter Z is a vector composed of the importance $Z_{i,j}$, and calculating a gradient of the structural parameter $\alpha$ on log p(Z) at the same time, wherein p($\alpha$) is a result after the structural parameter a is randomized by the following formula $$p(\alpha) = \frac{1}{1+\exp(-\alpha)} \quad (3)$$

S36, updating the weight parameter $\theta$ according to the gradient on the loss function L, and updating the structural parameter $\alpha$ according to the following formula at the same time:

$$E_{Z_{i,j}\sim p(Z_{i,j})}\left[\frac{\partial L}{\partial \alpha_{i,j}}\right] = E_{Z\sim p(Z_{i,j})}\left[\nabla_{\alpha_{i,j}} \log p(\alpha_{i,j}) \frac{\partial L}{\partial z_{i,j}}\right] \quad (4)$$

where $E_{Z,p(zi,j)}$, represents an expectation under a probability distribution of $p(Z_{i,j})$ during the activation parameter Z sampling, and $\nabla \alpha_{i,j}$ is a gradient of the structural parameter a of the $j^{th}$ branch in the $i^{th}$ multi-branch block on the log p(Z); and S37, returning to the S32 until the weight parameter $\theta$ and the structural parameter $\alpha$ in the hypernetwork are trained to converge;

S4, removing redundant branches from the hypernetwork after training to obtain an optimal subnetwork, and removing inactivated branches in the hypernetwork trained in the S3 according to formula (2);

S5, fusing the multi-branch optimal subnetwork into a single-branch optimal subnetwork; and S6, acquiring image features by using the single-branch optimal subnetwork, performing real-time reasoning, and performing image classification on the fused single-branch subnetwork.

2. The edge calculation-oriented reparametric neural network architecture search method of claim 1, wherein in the S5, the fusing the multi-branch optimal subnetwork into the single-branch optimal subnetwork is by a reparameterization method, comprises the following steps:

S51, performing reparametric fusion on weight parameters of a convolutional layer and a Batch Normalization (BN) layer in each reserved branch;

S52, fusing each branch into a convolution of a same scale as an original convolution by the reparameterization method, and fusing the convolution with the original convolution into one convolution respectively; and S53, fusing multi-branch convolutions F' in a same multi-branch block into one convolution.

3. The edge calculation-oriented reparametric neural network architecture search method of claim 2, wherein in the S51, formula for the reparametric fusion is as follows $$F'_{m,:,:,:} = \frac{\gamma_m}{\sigma_m}F_{m,:,:,:}, \quad b'_m = -\frac{\mu_m \gamma_m}{\sigma_m} + \beta_m \quad (5)$$

where $\gamma$ represents a scaling parameter of the BN layer, $\mu$ represents a mean value of BN layer features, $\sigma$ represents a standard deviation of the BN layer features, $\beta$ represents a translation parameter of the BN layer, $F'_{m,:,:,:}$ and $F_{m,:,:,:}$ represent weight parameters of an $m^{th}$ output channel of the convolutional layer after and before the reparametric fusion respectively, $b'_m$ represents an offset parameter of the $m^{th}$ output channel of the convolutional layer after the reparametric fusion, and: in the subscript represents all elements of a dimension of the convolutional layer after or before the reparametric fusion.

4. The edge calculation-oriented reparametric neural network architecture search method of claim 2, wherein in the S52, each branch is converted into the same scale as the original convolution respectively at first, and then the converted convolution of each branch is fused with the original convolution into the one convolution respectively according to a reparametric formula as follows:

$$F^j = F^2 * \text{TRANS}(F^1), \quad b^j_m = \sum_{d=1}^{D}\sum_{u=1}^{K_1}\sum_{v=1}^{K_2} b^1_d F^2_{m,d,u,v} + b^2_d \quad (6)$$

where TRANS represents a transposition operation on a tensor, F' represents a converted convolution of the $j^{th}$ branch, $F^2$ represents the original convolution, D is a number of input channels, $K_1$ and $K_2$ are convolution kernel sizes, $F^j$ represents a fused convolution corresponding to the $j^{th}$ branch, $b^j_m$ represents an offset of the $m^{th}$ output channel of the fused convolutional layer, $b^1_d$ represents an offset of the $d^{th}$ input channel of the converted convolution of the $j^{th}$ branch, $b^2_d$ represents an offset of the $d^{th}$ input channel of the original convolution, and $F^2_{m,d,u,v}$ represents a weight of the $u^{th}$ row and the $v^{th}$ column of the convolution kernel under the $m^{th}$ input channel and the $d^{th}$ output channel of the original convolution.

5. The edge calculation-oriented reparametric neural network architecture search method of claim 2, wherein in the S52, the branch convolutions are converted into the same scale as the original convolution through zero filling operation.

6. The edge calculation-oriented reparametric neural network architecture search method of claim 2, wherein in the S53, a reparametric formula of fusing the multiple-branch convolutions into the one convolution is as follows $$F'=F^1+F^2+\ldots+F^N, b'=b^1=b^2+\ldots+b^N \quad (7)$$

where N is a number of branches, and b' is an offset after fusion.

7. The edge calculation-oriented reparametric neural network architecture search method of claim 1, wherein after the initializing in the S31, firstly, the branches are sampled randomly, and only the weight parameter $\theta$ is updated; secondly, the importance of the branches is sampled, and the structural parameter a and the weight parameter $\theta$ are updated; finally, the importance of the branches is sampled, the structural parameter $\alpha$ is fixed, and only the weight parameter $\theta$ is updated.

8. The edge calculation-oriented reparametric neural network architecture search method of claim 1, wherein in the S32, the sampling noise follows a Logistics distribution log $(-\log (u_1) -\log (-\log(u_2))$ with a mean value being 0 and a variance being 1, where both $u_1$ and $u_2$ are $u_1 \sim U(0, 1)$, representing that $u_1$ follows a uniform distribution from 0 to 1.

9. The edge calculation-oriented reparametric neural network architecture search method of claim 1, wherein in the S1, the original convolutions are original K×K convolutions, each has 6 branches, which are: a 1×1 convolution, a 1×K convolution, a K×1 convolution, a 1×1-KXK convolution, a 1×1-AVG convolution and a short cut respectively.

10. The edge calculation-oriented reparametric neural network architecture search method of claim 1, wherein in the S1, a Batch Normalization (BN) operation is added after the operator of each branch, output results of each branch are added together according to elements, subject to a nonlinear operation, and the output results are combined as output of the current multi-branch blocks.

* * * * *